(12) United States Patent
Nakamura et al.

(10) Patent No.: US 7,068,339 B2
(45) Date of Patent: Jun. 27, 2006

(54) LIQUID CRYSTAL DISPLAY

(75) Inventors: Ichiroh Nakamura, Matsusaka (JP); Hidetomo Miyake, Matsusaka (JP); Hidehiko Yamaguchi, Taki-Gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/732,443

(22) Filed: Dec. 11, 2003

(65) Prior Publication Data
US 2004/0125299 A1 Jul. 1, 2004

(30) Foreign Application Priority Data

| Dec. 16, 2002 | (JP) | ............................ 2002-363366 |
| Nov. 7, 2003 | (JP) | ............................ 2003-377792 |

(51) Int. Cl.
*G02F 1/1345* (2006.01)

(52) U.S. Cl. ...................................... 349/152; 349/153

(58) Field of Classification Search ................ 349/153, 349/149, 152
See application file for complete search history.

(56) References Cited

U.S. PATENT DOCUMENTS

| 3,970,363 | A | * | 7/1976 | Geyer et al. ................. 349/154 |
| 5,235,741 | A | * | 8/1993 | Mase ........................... 29/830 |
| 5,332,869 | A | * | 7/1994 | Hagiwara .................... 174/257 |
| 5,682,218 | A | * | 10/1997 | Shimizu et al. .............. 349/156 |
| 6,501,525 | B1 | * | 12/2002 | Huang et al. ................ 349/150 |

FOREIGN PATENT DOCUMENTS

| JP | 57148721 A | * | 9/1982 |
| JP | 03058024 A | * | 3/1991 |
| JP | 03102325 A | * | 4/1991 |
| JP | 05273563 A | * | 10/1993 |
| JP | 06095061 A | * | 4/1994 |
| JP | 07-020487 | | 1/1995 |
| JP | 08-179345 | | 7/1996 |
| JP | 09090375 A | * | 4/1997 |
| JP | 2000-056314 | | 2/2000 |
| JP | 2000-199915 | | 7/2000 |
| WO | WO 00/45360 | | 8/2000 |

OTHER PUBLICATIONS

Chinese Office Action issued on Sep. 23, 2005, (w/English translation thereof).

* cited by examiner

*Primary Examiner*—Toan Ton
(74) *Attorney, Agent, or Firm*—Nixon & Vanderhye P.C.

(57) ABSTRACT

In order to provide a liquid crystal display causing no unevenness of the cell gap and preventing the occurrence of non-uniformity of a display in spite of a conductive material, for electrically connecting two substrates, provided in an area inside a sealant, the liquid crystal display has a configuration that a liquid crystal panel has a liquid crystal layer between two transparent substrates which are adhered to each other by a sealing adhesive and a conductive material is formed in a spot form along the liquid crystal layer side of the sealing adhesive so as to electrically connect opposing electrode connecting terminals to opposing common electrodes formed on the transparent substrates.

19 Claims, 6 Drawing Sheets

| PANEL NUMBER | NUMBER OF SPOTS OF CONDUCTIVE MATERIAL | BACKGROUND PATTERN (WINDOW IS ALL WHITE HAVING A SIZE OF 40%) | | | | | |
|---|---|---|---|---|---|---|---|
| | | HALF TONE GRAY 1H PIXEL DICED PATTERN | | HALF TONE MAGENTA 1H PIXEL DICED PATTERN | | HALF TONE GRAY 2H DOT DICED PATTERN | |
| | | SHADOW RATIO | VISUAL CONFIRMATION | SHADOW RATIO | VISUAL CONFIRMATION | SHADOW RATIO | VISUAL CONFIRMATION |
| SAMPLE 1 | FIVE APPLICATION PLACES | 0.522% | NO OCCURRENCE | 0.270% | NO OCCURRENCE | 0.215% | NO OCCURRENCE |
| SAMPLE 2 | FOUR APPLICATION PLACES | 0.255% | NO OCCURRENCE | 0.804% | NO OCCURRENCE | 0.525% | NO OCCURRENCE |
| SAMPLE 3 | THREE APPLICATION PLACES | 0.201% | NO OCCURRENCE | 0.894% | NO OCCURRENCE | 0.920% | NO OCCURRENCE |
| SAMPLE 4 | THREE APPLICATION PLACES | 0.303% | NO OCCURRENCE | 0.169% | NO OCCURRENCE | 1.119% | NO OCCURRENCE |
| SAMPLE 5 | THREE APPLICATION PLACES | 0.405% | NO OCCURRENCE | 0.000% | NO OCCURRENCE | 1.155% | NO OCCURRENCE |
| SAMPLE 6 | TWO APPLICATION PLACES | 0.000% | NO OCCURRENCE | 2.189% | NO OCCURRENCE | 5.511% | FAINT LEVEL |
| SAMPLE 7 | TWO APPLICATION PLACES | 0.000% | NO OCCURRENCE | 1.935% | FAIRLY FAINT LEVEL | 3.308% | FAINT LEVEL |
| SAMPLE 8 | TWO APPLICATION PLACES | 0.101% | NO OCCURRENCE | 0.910% | NO OCCURRENCE | 2.256% | FAIRLY FAINT LEVEL |

LIQUID CRYSTAL DISPLAY

BACKGROUND OF THE INVENTION

1. Field of the Invention

The present invention relates to a liquid crystal display provided with a liquid crystal panel having a liquid crystal layer between two transparent substrates which are adhered to each other by a sealing adhesive.

2. Description of the Prior Art

In recent years, a variety of sizes from compact to large scale of liquid crystal displays have been produced as the applications have been expanded. In particular, liquid crystal displays have been put into practice for a variety of applications which have not conventionally existed by utilizing the characteristics of the liquid crystal displays being light, thin and compact. Examples of the above liquid crystal displays include liquid crystal displays for laptop personal computers having large displays relative to the body sizes (ratios of effective display areas are large and frames are small) and for car navigation systems that require display sizes as large as possible relative to the prescribed sizes. As described above, research has been carried out for narrowing the width around the outside of the display (hereinafter, referred to as frame) to the minimum limit.

In a general liquid crystal display, two substrates on which electrode patterns, orientation films and the like are formed are adhered to each other using a sealing adhesive or an ultraviolet curing resin. At this time, it is necessary to provide a conductive material between the substrates in order to connect the electrodes on the two substrates. In such a case, a conductive material is generally provided in an area outside the sealant (on the side of the sealant opposite to the display). However, a conductive material cannot apply to the outside of the sealant due to the lack of space in some cases, resulting from the liquid crystal display to be designed to have a narrow frame.

Japanese Laid-Open Patent Application No. 2000-199915 discloses a liquid crystal display panel wherein two substrates are electrically connected to each other by making the sealing adhesive include conductors in a spherical form. It is unnecessary to provide a conductive material outside the sealant, so that the frame can be narrowed according to the above configuration.

However, there is a possibility in the configuration of Japanese Laid-Open Patent Application No. 2000-199915 that a sufficient conduction cannot be obtained. Therefore, provision of a conductive material in an area inside the sealant can be considered in order to secure a sufficient conduction while narrowing the frame. In the case where a general resistor paste is used as the conductive material, however, unevenness of the cell gap and non-uniformity of display may be caused during an adhesion process or during a pressing process due to the rigidity of the resistor paste higher than that of the sealing adhesive. In addition, a resistor paste having a low viscosity cannot be used because it spreads at the time of application.

SUMMARY OF THE INVENTION

In view of the above problems, an object of the present invention is to provide a liquid crystal display causing no unevenness of the cell gap and preventing the occurrence of non-uniformity of a display in spite of a conductive material, for electrically connecting two substrates, provided in an area inside a sealant.

In order to achieve the above object, the present invention provides a liquid crystal display comprising a liquid crystal panel having a liquid crystal layer between two transparent substrates that are adhered to each other by a sealing adhesive, wherein a conductive material, for electrically connecting electrodes formed on the transparent substrates, is provided in a spot form along the liquid crystal layer side of the sealing adhesive.

The conductive material is provided along the sealing adhesive as described above, thereby unevenness of the thickness due to the cell gap is located away from the active area so that unevenness of the thickness throughout the display panel is reduced preventing the occurrence of unevenness of the display.

It is desirable for spots formed of the conductive material to be formed either in the four corners or in any three corners out of the four corners of the liquid crystal panel on the liquid crystal layer side of the sealing adhesive.

In addition, plastic beads for maintaining the cell gap at a constant are mixed into the liquid crystal layer or ribs for maintaining the cell gap at a constant are formed on surface portions of the transparent substrates that make contact with the liquid crystal layer, that is, plastic beads or ribs are provided so as to avoid the conductive material, thereby the conductive material is not provided between a plastic bead or a rib and a transparent substrate without causing unevenness of the cell gap, making the occurrence of the non-uniformity of the display difficult.

It is noted that an ultraviolet curing material can be used for the conductive material.

DESCRIPTION OF THE PREFERRED EMBODIMENTS

Figure 1:
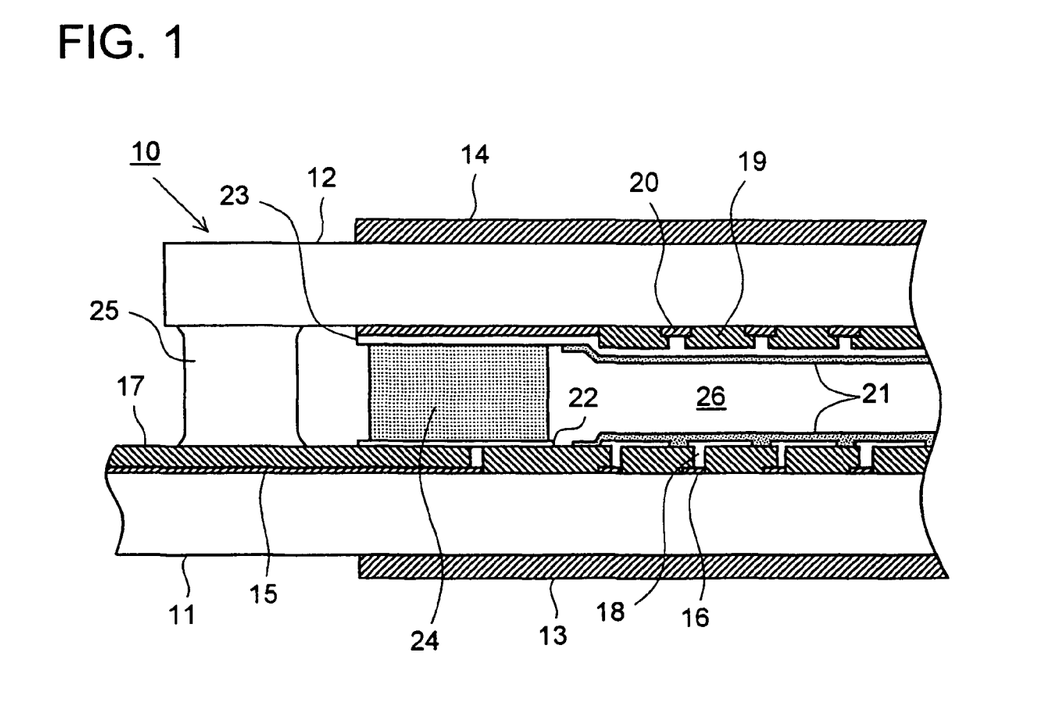
FIG. 1 is a cross sectional view showing a predetermined portion of a TFT active matrix-type color liquid crystal panel according to the present invention.

Hereinafter, embodiments of the present invention will be described with reference to the drawings. FIG. 1 is a cross sectional view showing a predetermined portion of a TFT active matrix-type color liquid crystal panel 10. Reference numerals 11 and 12 denote first and second transparent substrates made of non alkaline glass or the like, and reference numerals 13 and 14 denote polarizing plates adhered to the outside of the respective transparent substrates 11 and 12.

In addition, a reference numeral 15 denotes a wire made of metal thin film or the like; a reference numeral 16 denotes a drain electrode for connecting the wire 15 to a TFT (not shown); a reference numeral 17 denotes an insulating film made of acrylic resin or the like formed on the wire 15 or on the first transparent substrate 11; and a reference numeral 18 denotes a pixel electrode made of a transparent conductive film for each pixel dot, which is connected to the drain electrode 16 through a connection hole in the insulating film 17.

In addition, a reference numeral 19 denotes a color filter adhered to each pixel dot inside the second transparent substrate; a reference numeral 20 denotes a black matrix for blocking light from the non-display portion; and a reference numeral 21 denotes orientation films respectively applied to the pixel electrodes 18 and to an opposing common electrode 23 (which will be described below).

In addition, a reference numeral 22 denotes an opposing electrode connecting terminal made of a transparent conductive film, which is formed on the insulating film 17 and which is connected to the wire 15 through a connection hole; and a reference numeral 23 denotes an opposing common electrode made of transparent conductive film, which is formed on the color filters 19 and the black matrix 20. A reference numeral 24 denotes a conductive material made of a resistor paste or the like for the opposing electrode connecting terminal 22 to the opposing common electrode 23, which is provided in a spot form. A reference numeral 25 denotes a sealing adhesive provided around approximately the entire external periphery of the second transparent substrate 12, which adheres the second transparent substrate 12 to the insulating film 17. Finally, the portion surrounded by the orientation films 21 and the conductive material 24 is filled with a liquid crystal layer 26.

Next, a manufacturing process for a liquid crystal display provided with the liquid crystal panel 10 will be described. The manufacturing process is divided into three main processes: an array process, a cell process and a module process. The array process is a process for preparing an array substrate having the wire 15, the drain electrodes 16, the insulating film 17, the pixel electrodes 18, the opposing electrode connecting terminal 22, TFTs and the like by processing the first transparent substrate 11.

The next process, the cell process, is a process for carrying out the surface treatment on the array substrate that has been completed in advance and a substrate to be opposed to this, i.e., the second transparent substrate, then assembling by adhering them to each other, and injecting and sealing liquid crystal into and in the gap between the two transparent substrates The final module process is a process for attaching an electronic circuit that drives the display through electrical control to the array and cell substrate that has been completed in advance and, furthermore, is a process for attaching electronic parts and materials, such as a backlight that becomes a light source, to the array and cell substrate.

Hereinafter, the cell process will be described in detail. First, the orientation film 21 is formed on the TFT array substrate that has been completed. In order to form the orientation film 21, polyimide resin or the like is dissolved in a solvent, so that it is printed on the TFT array substrate using a precise rubber plate or the like, or it is applied to the TFT array substrate by means of a spinner method. Herein, the printing is carried out so that the thickness of the orientation film 21 becomes several thousands of angstroms. After that, the substrate is dried and baked, so that the thickness of the orientation film 21 becomes 500 to 1000 angstroms.

Next, trenches (not shown) are formed on the surface of the orientation film 21 in order to determine the direction of alignment of the liquid crystal molecules. Concretely, the surface of the orientation film 21 is rubbed with a roller around which cloth having thick pile is wound while rotating the roller. Next, the sealing adhesive 25 is applied to the first transparent substrate 11 or to the second transparent substrate 12 by means of screen printing. At the same time, the conductive material 24 is provided in a spot form on the substrate along the liquid crystal layer side of the sealing adhesive 25. In addition, spacers such as plastic beads are scattered on the display in order to maintain a constant cell gap. As for the scattering method, a method for scattering the spacers in powder form by applying a high voltage to the spacers can be used, so that the spacers are scattered through the static electrical force (dry scattering).

It is noted that ribs having a constant thickness may be formed on the surface of the transparent substrate 11 or 12 as another means for maintaining a constant cell gap.

Next, the two-electrode substrates are precisely adhered to each other using a mask pattern for positioning that has been prepared in advance. Pressure is applied to the substrates that have been adhered to each other, in order to enhance the tightness of the seal while the substrates are irradiated with heat and ultraviolet rays, so that the sealing adhesive 25 and the conductive material 24 are cured.

After that, the excess outside peripheral portion of the substrates that have been adhered to each other is cut and removed. In addition, in the case where the substrates are cut into multiple liquid crystal panels, such described cutting is carried out simultaneously.

Then, a liquid crystal material is injected into hollow cells that have been separated by means of a vacuum-scheme injection unit. After the injection of the liquid crystal material, an adhesive is applied to the injection hole of each cell and each hole is sealed through the application of heat or ultraviolet rays.

Finally, the polarizing plates 13 and 14, to which adhesive has been applied, are adhered to the transparent substrates 11 and 12, respectively, by applying pressure with a rubber roller so that no bubbles remain. The liquid crystal panel 10, which has been completed in such a manner, is passed to the module process after undergoing an electrical test, an image inspection and the like.

In this liquid crystal panel 10, the conductive material 24 is applied to the inside of the sealing adhesive 25 (the liquid crystal layer 26 side) due to the restricted dimensions of the outer panel form. At the time of adhering and pressing the substrates together, the conductive material 24 is more rigid than the sealing adhesive 25 and the cell gap becomes uneven causing non-uniformity of the display. In addition, a resistor paste having a low viscosity cannot be used because it spreads at the time of application. The conductive material 24 having a viscosity of 35 to 45 PA·s is used in the present embodiment.

Figure 2:
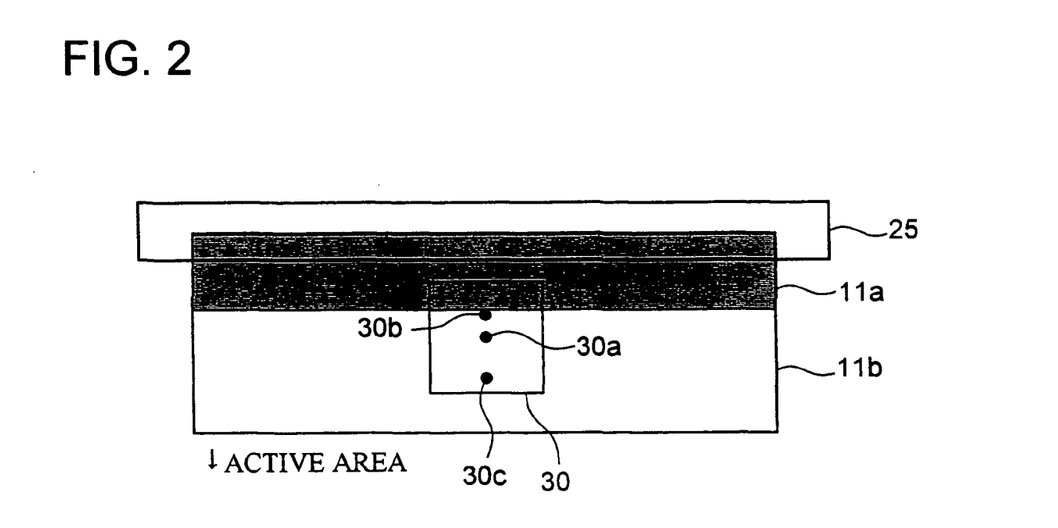
FIG. 2 is a diagram for describing application positions of the conductive material according to the present invention.

In order to solve such non-uniformity of the display, the conductive material 24 is separated from the active area so as to be formed in the vicinity of the sealing adhesive 25 according to the present invention. FIG. 2 shows the application positions of the conductive material 24. In FIG. 2, the width of a sealant layer is 1 mm, the width of a frame BM is 1.5 mm and the width of a frame region is 2.5 mm. In addition, a conductive material application pad 30, to which the conductive material 24 is applied, is in a square form having 1 mm sides. Herein, the distance between a center 30a of the conductive material application pad 30 and the sealing adhesive 25 is 0.7 mm.

In the case where a spot of the conductive material 24 is formed, for example, at the center 30a of the conductive material application pad 30, the difference in the cell gap vis-à-vis the peripheral portion is 0.2 μm. In addition, in the case where a spot of the conductive material 24 is formed at a position 30*b* which is 200 μm away from the center 30*a* of the conductive material application pad 30 in the direction of the sealing adhesive 25, the difference in the cell gap vis-à-vis the peripheral portion is equal to or less than 0.2 μm. On the other hand, in the case where a spot of the conductive material 24 is formed at a position 30*c* which is 400 μm away from the center 30*a* in the direction of the active area, the difference in the cell gap vis-à-vis the peripheral portion is 0.2 to 0.4 μm. Herein, a carbon resistor paste (trade name: TU-30SK manufactured by Asahi Chemical Research Laboratory Co., Ltd.) is used for the conductive material 24. In addition, the diameter of the spots of the conductive material 24 is approximately 250 μm. It is noted that the following measurements are carried out in the same conditions.

It is understood from the above-described measurement results that unevenness of the cell gap decreases as the spot of the conductive material 24 is formed at a position further away from the active area, that is, at a position closer to the sealing adhesive 25. Accordingly, it is desirable to form the conductive material 24 at a position close to the sealing adhesive 25. In addition, non-uniformity of thickness due to the cell gap exists at a place far from the active area by positioning the conductive material 24 close to the sealing adhesive 25; therefore, non-uniformity of thickness of the display is reduced, making it difficult for the non-uniformity of the display to occur.

In addition, according to another method for eliminating non-uniformity of the display, the conductive material 24 can be formed in the four corners of the liquid crystal panel 10 on the liquid crystal layer 26 side of the sealing adhesive 25, or can be formed along the shorter sides of the liquid crystal panel 10 or along the longer sides of the liquid crystal panel 10.

Figure 3:
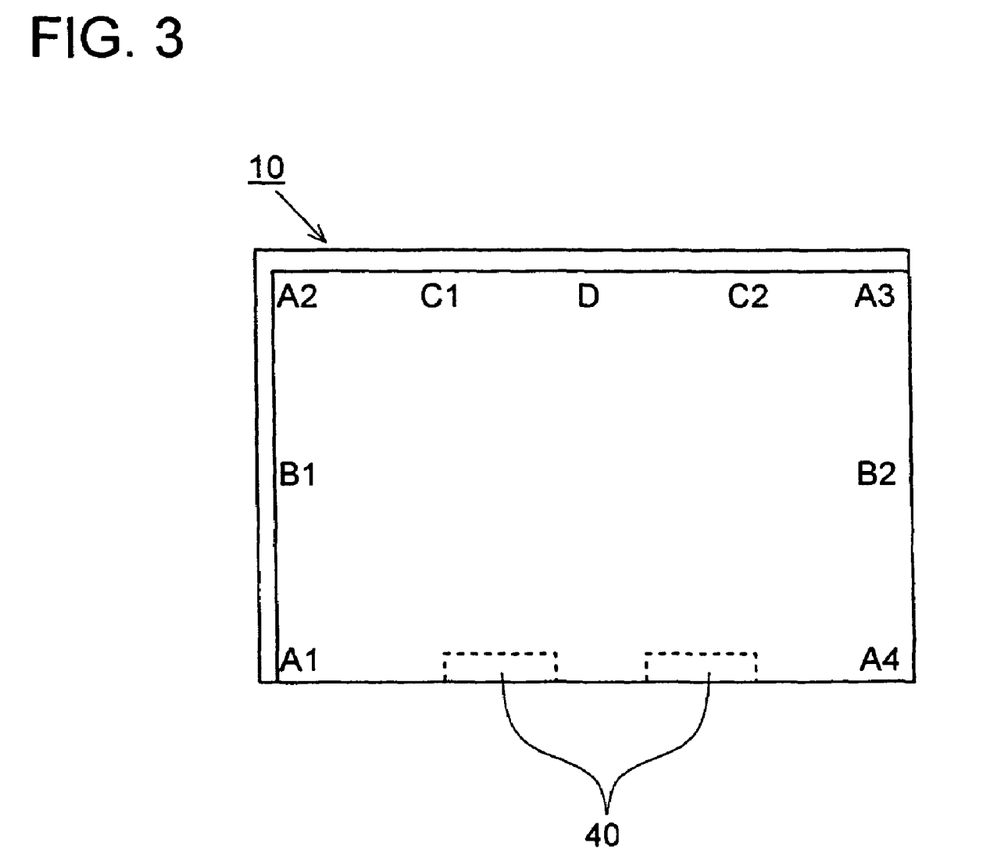
FIG. 3 is a plan view of a liquid crystal panel showing application positions of the conductive material according to the present invention.

FIG. 3 is a plan view of the liquid crystal panel 10 showing application positions of the conductive material 24. Two liquid crystal injection holes 40 are formed along one of the longer sides of the liquid crystal panel. FIG. 3 illustrates that the shorter sides of the liquid crystal panel 10 are 207 mm in length and the longer sides of the liquid crystal panel 10 are 275 mm in length. The cell gaps of this liquid crystal panel 10 in the case where the conductive material 24 is formed at positions of A1 to D are measured.

As a result of the measurements, in the case where spots of the conductive material 24 are formed at the positions A1 to A4 in the four corners of the liquid crystal panel 10, the difference in the cell gap vis-à-vis the peripheral portion is less than 0.2 μm. In addition, in the case where spots of the conductive material 24 are formed at the positions B1 and B2 along the middle portion of the shorter sides of the liquid crystal panel 10, the difference in the cell gap vis-à-vis the peripheral portion is 0.2 μm. Furthermore, in the case where a spot of the conductive material 24 is formed at the position D along the middle portion of the longer side of the liquid crystal panel 10, the difference in the cell gap vis-à-vis the peripheral portion is 0.3 μm. Furthermore, spots of the conductive material 24 are formed at the positions C1 and C2 along the middle portion between the position D and the positions A1 to A4 of the longer side of the liquid crystal panel 10, the difference in the cell gap vis-à-vis the peripheral portion is 0.2 μm.

It can be seen by the above-described measurement result that almost no non-uniformity of thickness is caused by the cell gap in the case where spots of the conductive material 24 are formed in the four corners of the liquid crystal panel. In addition, it can be seen that the cell gap becomes more uneven as the positions of the spots of the conductive material 24 become further away from the four corners of the liquid crystal panel 10. This is caused by slackness of the transparent substrates 11 and 12 due to the conductive material 24 being more rigid than the sealing adhesive. In addition, unevenness of the cell gap is, generally, easily formed along the side facing the liquid crystal injection holes 40 due to poor release of air at the time of pressing. Accordingly, it is desirable for the spots of the conductive material 24 to be formed at positions in the vicinity of the four corners of the liquid crystal panel along the sealing adhesive 25. As a result, the unevenness of the thickness of the display is reduced, making it difficult for the non-uniformity of the display to occur.

In addition, the amount of application (application area and application thickness) as well as the number of places of application of the conductive material 24 can be limited as another method for eliminating non-uniformity of the display.

For example, in the case where the diameter of the spots of the conductive material 24 is 369.8 μm, the difference in the cell gap vis-à-vis the peripheral portion is 0.1 μm; in the case where the diameter of the spots of the conductive material 24 is 409.9 μm, the difference in the cell gap vis-à-vis the peripheral portion is 0.2 μm; and in the case where the diameter of the spots of the conductive material 24 is 415.9 μm, the difference in the cell gap vis-à-vis the peripheral portion is 0.4 μm.

As a result of the above-described measurements, the cell gap increases as the amount of application increases. This is because the conductive material 24 is resistant to pressure; therefore, non-uniformity of the thickness can be eliminated by reducing the size of the application area so as to reduce the amount of application. It is noted that the size of the application area is controlled and the thickness of the application area is measured in the conductive material application unit.

In addition, unevenness of the thickness due to the cell gap is occurred when the conductive material 24 is applied; therefore, the unevenness of the thickness due to the cell gap can be eliminated by reducing the number of places of application. However, a predetermined conduction cannot be obtained when the number of places of application is too small. Therefore, the following measurements are carried out in order to find the number of places of application of the conductive material 24 that satisfies the predetermined resistance value (e.g., 30 Ω).

Figure 4:
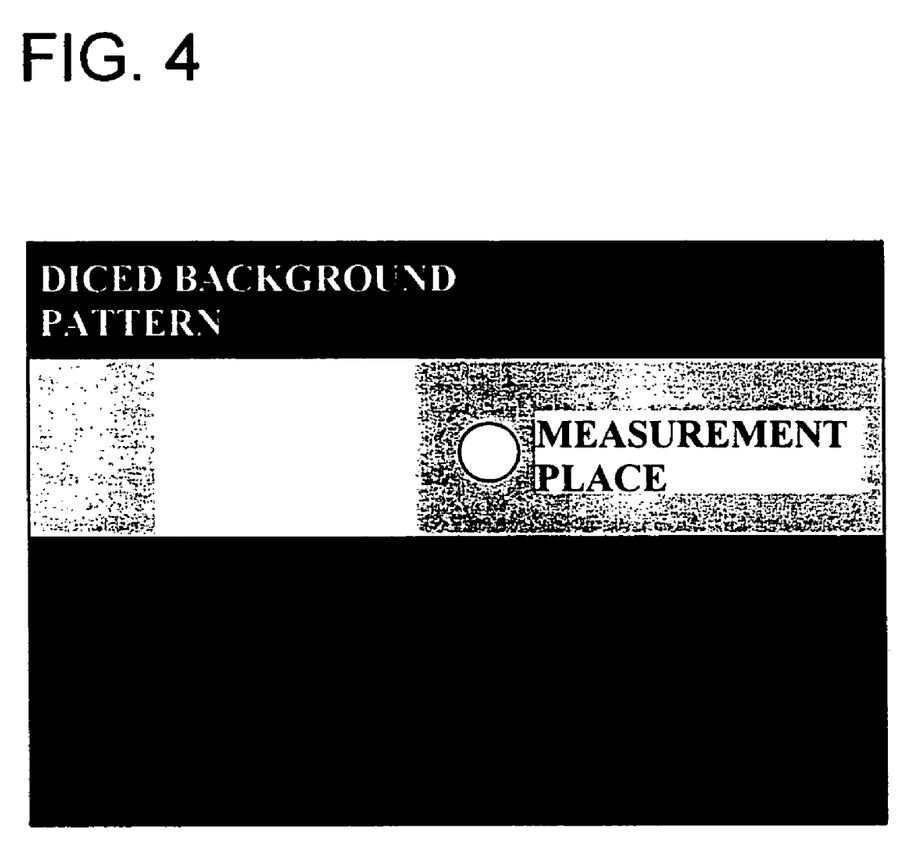
FIG. 4 is a diagram showing a place where a sample is measured according to the present invention.

A 15-inch liquid crystal panel 10 is used as a sample and BM-5A (Field=2°) manufactured by Topcon Co., Ltd. is used as a measuring device. The measurements are carried out under the condition that a backlight has been turned on for one hour or more in an atmosphere of 25° C. Shadow ratio=brightness at the time of window display/brightness at the time of the entire background display −1.0 wherein the evaluation is carried out by the naked eye with a frontal view. The following three patterns that shadow can be easily seen are used for the background pattern: half tone gray 1H pixel diced pattern; half tone magenta 1H pixel diced pattern; and half tone gray 2H dot diced pattern. FIG. 4 is a diagram showing places of measurement.

Figure 5:
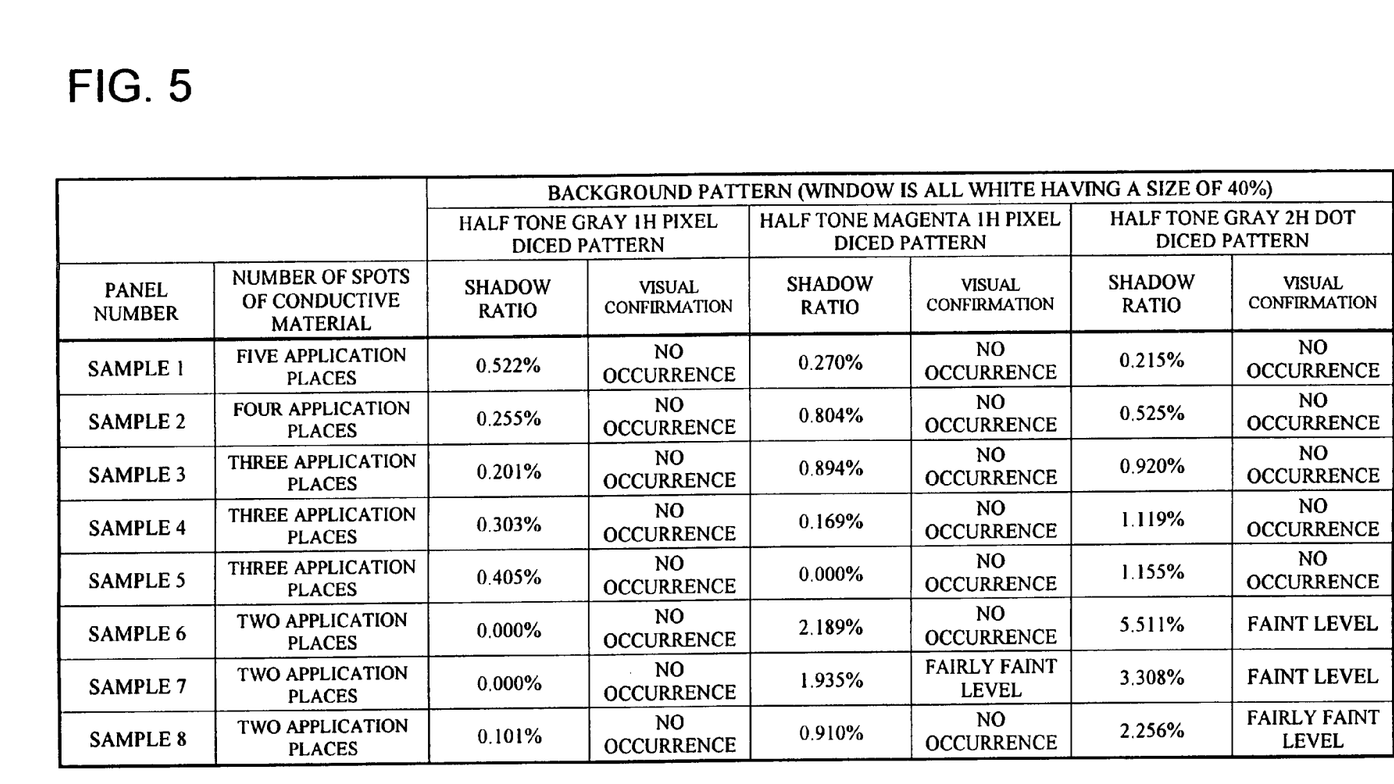
FIG. 5 is a table showing the results of the measurements of shadow quality with respect to the number of spots of the conductive material according to the present invention.
Figure 6:
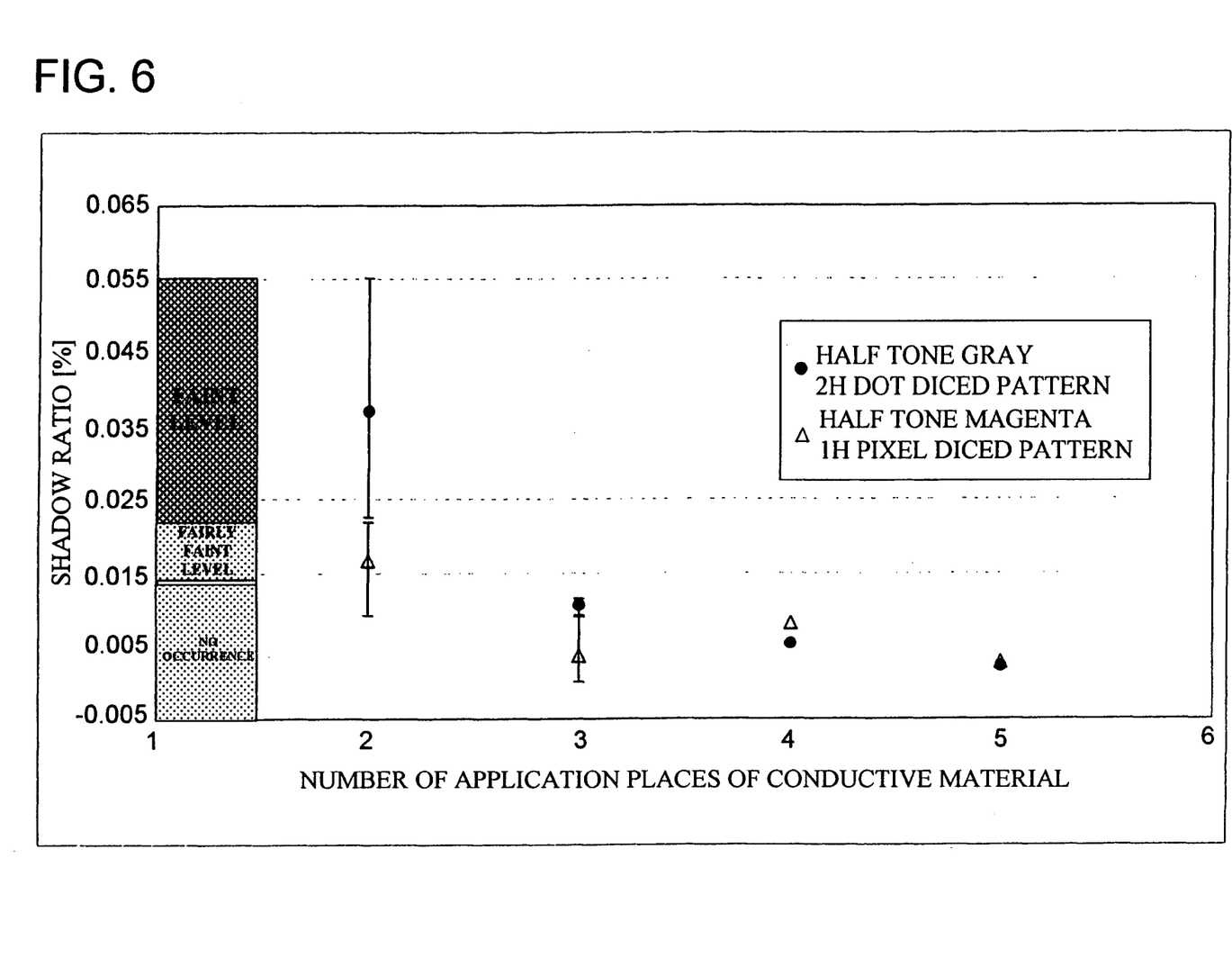
FIG. 6 is a graph showing the shadow ratio with respect to the number spots of the conductive material according to the present invention.

FIG. 5 is a table showing the measurement results of the shadow quality with respect to the number of places of application of the conductive material 24, and FIG. 6 is a graph showing the shadow ratio with respect to the number of places of application of the conductive material 24. Eight samples having different numbers of places of application of the conductive material 24 are measured. Sample 1 has five places of application of the conductive material 24 wherein the application positions correspond to A1 to A3 and C1 to C2 in FIG. 3. Sample 2 has four places of application of the conductive material 24 wherein the application positions correspond to A1 to A3 and C1 in FIG. 3. Samples 3 to 5 have three places of application of the conductive material 24 wherein the application positions correspond to A1 to A3 in FIG. 3. Samples 6 to 8 have two places of application of the conductive material 24 wherein the application positions correspond to A1 to A3 in FIG. 3.

As a result of confirmation of Samples 3 to 5 having three application places by the naked eye, the occurrence of longitudinal/lateral shadow is not recognized in the half tone gray 2H dot diced pattern in which the opposing charge shortage is severe. The lateral shadow ratio is equal to or less than 1.5%. In addition, the lateral shadow ratio is equal to or less than 0.9% in the 1H pixel diced pattern.

The shadow ratio becomes drastically higher in Samples 6 to 8 having two application places. The level allowing a faint view of the half tone gray 2H dot diced pattern may be achieved while the level allows a fairly faint view of the half tone magenta 1H pixel diced pattern, which is the worst pattern for practical use (=at the time of completion of WINDOWS (R) (except for XP)).

Accordingly, the level having no problems is considered to be achieved as long as the conductive material 24 is applied at two places without fail. However, it is desirable to apply the material at three places taking into consideration the possibility of failure of the application and margin required in the case of small application areas.

It is noted that no problems arise in Samples 3 to 8 where spots can be formed in the corners of the liquid crystal panel 10 while non-uniformity of the display easily occurs in Samples 1 and 2 wherein it is necessary to form spots along the longer sides of the liquid crystal panel 10.

Figure 7A:
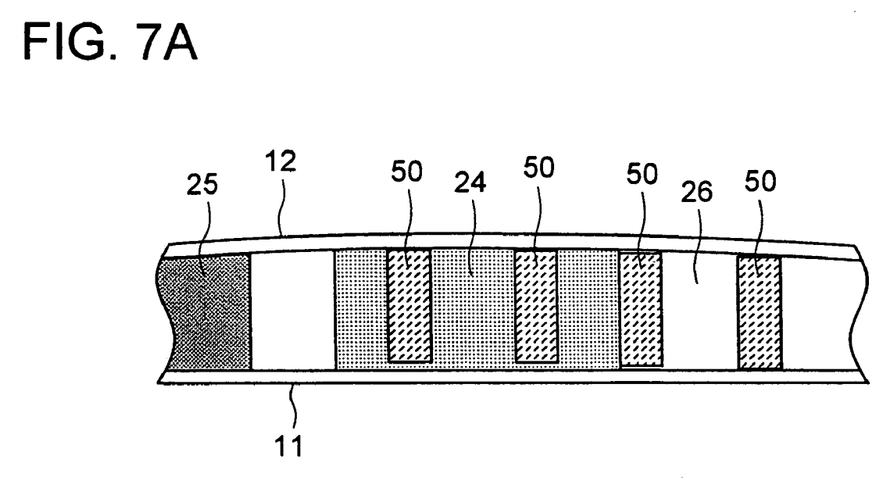
FIG. 7A is a schematic cross sectional view showing a liquid crystal panel in the case where spacers are mixed into the conductive material according to the present invention.
Figure 7B:
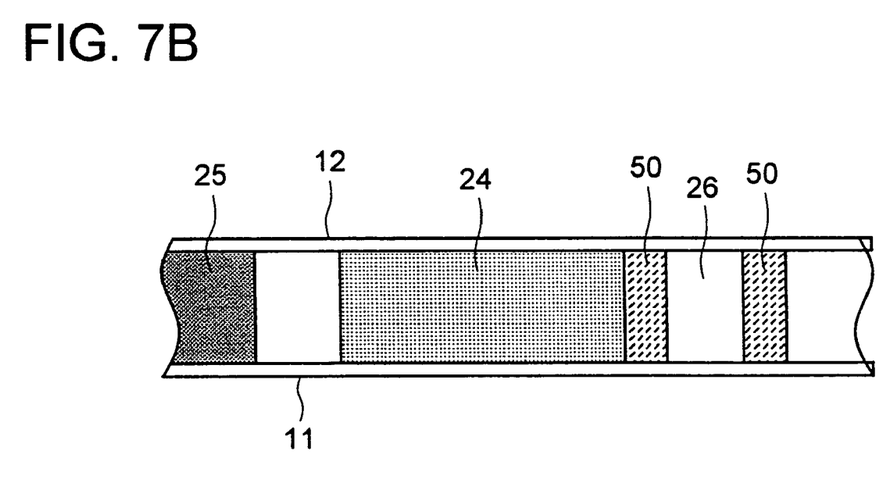
FIG. 7B is a schematic cross sectional view showing a liquid crystal panel in the case where no spacers are mixed into the conductive material according to the present invention.

In addition, according to the present invention, plastic beads (spacers) are mixed into the liquid crystal layer 26 or ribs are formed on the transparent substrate 11 or 12 in order to maintain a constant cell gap so as to eliminate non-uniformity of the display. Herein, it is desirable for the spacers or the ribs not to be provided at the application position of the conductive material 24. FIG. 7A shows a schematic cross sectional view of a liquid crystal panel in the case where spacers are mixed into the conductive material 24 while FIG. 7B shows a schematic cross sectional view of a liquid crystal panel in the case where no spacers are mixed into the conductive material 24.

As shown in FIG. 7A, in the case where spacers 50 are mixed into the conductive material 24, the conductive material 24 is placed between the spacer 50 and the transparent substrate 11 or 12 causing unevenness of the cell gap. This is because carbon powder is included in the conductive material 24. According to the present invention, the spacers 50 are dispersed or ribs are formed so as to avoid the conductive material 24, thereby unevenness of the cell gap is eliminated, making it difficult for the non-uniformity of the display to occur.

What is claimed is:

1. A liquid crystal display comprising:
   a liquid crystal panel a liquid crystal layer between two transparent substrates that are adhered to each other by a sealing adhesive, the two transparent substrates including a first substrate supporting an array of switching elements and corresponding pixel electrodes and a second substrate supporting a common electrode;
   a conductive wiring provided at least in a peripheral area of the display and supported by the first substrate;
   an insulating film supported by the first substrate and provided over at least parts of the wiring and the switching elements;
   a transparent conductive pad supported by the first substrate and electrically connected to the conductive wiring through at least one aperture defined in the insulating film, wherein the transparent conductive pad is provided over the insulating film;
   a conductive material, for electrically connecting the transparent conductive pad supported by the first substrate to the common electrode supported by the second substrate, the conductive material being provided in a spot form along the liquid crystal layer side of the sealing adhesive.

2. The liquid crystal display according to claim 1, wherein spots formed of the conductive material are formed in the four corners of the liquid crystal panel on the liquid crystal layer side of the sealing adhesive.

3. The liquid crystal display according to claim 2, wherein plastic beads for maintaining the cell gap at a constant are mixed into the liquid crystal layer.

4. The liquid crystal display according to claim 3, wherein the conductive material is an ultraviolet curing material.

5. The liquid crystal display according to claim 2, wherein a rib for maintaining the cell gap at a constant is formed on surface portion of at least one of the transparent substrates that makes contact with the liquid crystal layer.

6. The liquid crystal display according to claim 5, wherein the conductive material is an ultraviolet curing material.

7. The liquid crystal display according to claim 2, wherein the conductive material is an ultraviolet curing material.

8. The liquid crystal display according to claim 1, wherein spots formed of the conductive material are formed in any three corners out of the four corners of the liquid crystal panel on the liquid crystal layer side of the sealing adhesive.

9. The liquid crystal display according to claim 8, wherein plastic beads for maintaining the cell gap at a constant are mixed into the liquid crystal layer.

10. The liquid crystal display according to claim 9, wherein the conductive material is an ultraviolet curing material.

11. The liquid crystal display according to claim 8, wherein a rib for maintaining the cell gap at a constant is formed on surface portion of at least one of the transparent substrates that makes contact with the liquid crystal layer.

12. The liquid crystal display according to claim 11, wherein the conductive material is an ultraviolet curing material.

13. The liquid crystal display according to claim 8, wherein the conductive material is an ultraviolet curing material.

14. The liquid crystal display according to claim 1, wherein plastic beads for maintaining the cell gap at a constant are mixed into the liquid crystal layer.

15. The liquid crystal display according to claim 14, wherein the conductive material is an ultraviolet curing material.

16. The liquid crystal display according to claim 1, wherein a rib for maintaining the cell gap at a constant is formed on a surface portion of at least one of the transparent substrates that makes contact with the liquid crystal layer.

17. The liquid crystal display according to claim 16, wherein the conductive material is an ultraviolet curing material.

18. The liquid crystal display according to claim 1, wherein the conductive material is an ultraviolet curing material.

19. The liquid crystal display of claim 1, wherein the insulating film is provided between the sealing adhesive and the first substrate.

* * * * *